(12) United States Patent
Sundaresan et al.

(10) Patent No.: US 6,651,059 B1
(45) Date of Patent: Nov. 18, 2003

(54) SYSTEM AND METHOD FOR THE AUTOMATIC RECOGNITION OF RELEVANT TERMS BY MINING LINK ANNOTATIONS

(75) Inventors: Neelakantan Sundaresan, San Jose, CA (US); Jeonghee Yi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/440,602

(22) Filed: Nov. 15, 1999

(51) Int. Cl.[7] .............................................. G06F 17/30
(52) U.S. Cl. ............................................. 707/6; 707/3
(58) Field of Search ................................ 707/1–3, 6–7

(56) References Cited

U.S. PATENT DOCUMENTS

| | | | | |
|---|---|---|---|---|
| 5,488,725 A | * | 1/1996 | Turtle et al. ...................... | 707/5 |
| 5,745,360 A | | 4/1998 | Leone et al. ................. | 364/140 |
| 5,819,260 A | | 10/1998 | Lu et al. ......................... | 707/3 |
| 5,857,179 A | * | 1/1999 | Vaithyanathan et al. ........ | 707/2 |
| 5,963,940 A | * | 10/1999 | Liddy et al. .................... | 707/5 |

(List continued on next page.)

OTHER PUBLICATIONS

Frank I. Wolf, "Elements of Probability and Statistics", 1974, McGraw–Hill, Second Edition, pp. 68–71.*

R. Larson, "Bibliometrics of the World Wide Web: An Exploratory Analysis of the Intellectual Structure of Cyberspace," the Proceedings of the 1966 American Society for Information Science Annual Meeting, also published as a technical report, School of Information Management and Systems, University of California, Berkeley, 1996, which is published on the Word Wide Web at URL: http://sherlock-.sims.berkeley.edu/docs/asis96/asis96.html.

D. Gibson et al., "Inferring Web Communities from Link Topology," Proceedings of the 9th ACM. Conference on Hypertext and Hypermedia, Pittsburgh, PA, 1998.

D. Turnbull. "Bibliometrics and the World Wide Web," Technical Report University of Toronto, 1996.

K. McCain, "Mapping Authors in Intellectual Space: A technical Overview," Journal of the American Society for Information Science, 41(6):433–443, 1990.

(List continued on next page.)

*Primary Examiner*—Safet Metjahic
*Assistant Examiner*—Hanh Thai
(74) *Attorney, Agent, or Firm*—Samuel A. Kassatly

(57) ABSTRACT

A computer program product is provided as an automatic mining system to identify a set of relevant terms from a large text database of unstructured information, such as the World Wide Web (WWW), with a high degree of confidence, by association mining and refinement of co-occurrences using hypertext link metadata. The automatic mining system includes a software package comprised of a metadata extractor, a document vector module, an association module, and a filtering module. The automatic mining system further includes a database for storing the mined sets of relevant terms. The automatic mining system scans the downloaded hypertext links, rather than the entire body of the documents for related information. As a result, the crawler is not required to provide a relatively lengthy download of the document content, and thus, the automatic mining system minimizes the download and processing time.

30 Claims, 3 Drawing Sheets

U.S. PATENT DOCUMENTS

| | | | | |
|---|---|---|---|---|
| 6,064,767 | A | * 5/2000 | Muir et al. | 382/190 |
| 6,233,575 | B1 | * 5/2001 | Agrawal et al. | 707/6 |
| 6,374,217 | B1 | * 4/2002 | Bellegarda | 704/240 |
| 6,377,949 | B1 | * 4/2002 | Gilmour | 707/10 |
| 6,411,962 | B1 | * 6/2002 | Kupiec | 707/102 |
| 6,493,711 | B1 | * 12/2002 | Jeffrey | 707/5 |
| 6,510,406 | B1 | * 1/2003 | Marchisio | 704/9 |

OTHER PUBLICATIONS

S. Brin, "Extracting Patterns and Relations from the World Wide Web," WebDB, Valencia, Spain, 1998.

R. Agrawal et al., "Fast Algorithms for Mining Association Rules," Proc. of the 20th Int'l Conference on VLDB, Santiago, Chile, Sep. 1994.

R. Agrawal et al., Mining Association Rules Between Sets of Items in Large Databases, Proceedings of ACM SIGMOD Conference on Management of Data, pp. 207–216, Washington, D.C., May 1993.

S. Chakrabarti et al. "Focused Crawling: A New Approach to Topic–Specific Web Resource Discovery," Proc. of The $8^{th}$ International World Wide Web Conference, Toronto, Canada, May 1999.

B. Huberman et al., "Strong Regularities in World Wide Web Surfing," Xerox Palo Alto Research Center.

A. Hutchunson, Metrics on Terms and Clauses, Department of Computer Science, King's College London.

J. Kleinberg, "Authoritative Sources in a Hyperlinked Environment," Proc. of 9th ACM–SIAM Symposium on Discrete Algorithms, May 1997.

R. Srikant et al., "Mining Generalized Association Rules," Proceedings of the $21^{st}$ VLDB Conference, Zurich, Swizerland, 1995.

W. Li et al., Facilitating comlex Web queries through visual user interfaces and query relaxation, published on the Word Wide Web at URL: http://www.7scu.edu.au/programme/fullpapers/1936/com1936.htm as of Aug. 16, 1999.

G. Piatetsky–Shapiro, "Discovery, Analysis, and Presentation of Strong Rules," pp. 229–248.

R. Miller et al., "SPHINX: A Framework for Creating Personal, Site–specific Web Crawlers," published on the Word Wide Web at URL: http://www.7scu.edu.au/programme/fullpapers/1875/com1875.htm as of Aug. 16, 1999.

S. Soderland. Learning to Extract Text–based Information from the World Wide Web, American Association for Artificial Intelligence (www.aaai.org), pp. 251–254.

G. Plotkin. A Note Inductive Generalization, pp. 153–163.

R. Feldman et al., "Mining Associations in Text in the Presence of Background Knowledge," Proceedings of the Second International Conference on Knowledge Discovery and Data Mining, Aug. 2–4, 1996, Portland, Oregon.

R. Kumar et al., "Trawling the Web for Emerging Cyber–Communities," published on the Word Wide Web at URL: http://www8.org/w8–papers/4a–search–mining/trawling/trawling.html as of Nov. 13, 1999.

"Acronym Finder", published on the Word Wide Web at URL: http://acronymfinder.com/as of Sep. 4, 1999.

* cited by examiner

SYSTEM AND METHOD FOR THE AUTOMATIC RECOGNITION OF RELEVANT TERMS BY MINING LINK ANNOTATIONS

CROSS-REFERENCE TO RELATED APPLICATIONS

This application is related to patent application Ser. No. 09/440,625, titled "System and Method for the Automatic Mining of Acronym-expansion Pairs Patterns and Formation Rules", that issued as U.S. Pat. No. 6,385,629 on May 7, 2002; to patent application Ser. No. 09/439,379, titled "System and Method for the Automatic Mining of Patterns and Relations", that issued as U.S. Pat. No. 6,505,97 on Jan. 7, 2003; to patent application Ser. No. 09/440,203, titled "System and Method for the Automatic Construction of Generalization—Specialization Hierarchy of Terms", that issued as U.S. Pat. No. 6,519,602; to patent application Ser. No. 09/439,758, titled "System and Method for the Automatic Discovery of Relevant Concepts from the World Wide Web", and to patent application Ser. No. 091/440,626, titled "System and Method for the Automatic Mining of New Relationships", all of which are filed by the same assignee as this application on even date herewith, and are incorporated herein by reference in their entirety.

FIELD OF THE INVENTION

The present invention relates to the field of data mining, and particularly to a software system and associated methods for identifying relevant terms from a large text database of unstructured information, such as the World Wide Web (WWW). More specifically, the present invention relates to the automatic and iterative recognition of relevant terms by association mining and refinement of co-occurrences using hypertext link metadata.

BACKGROUND OF THE INVENTION

The World Wide Web (WWW) is a vast and open communications network where computer users can access available data, digitally encoded documents, books, pictures, and sounds. With the explosive growth and diversity of WWW authors, published information is oftentimes unstructured and widely scattered. Although search engines play an important role in furnishing desired information to the end users, the organization of the information lacks structure and consistency. Web spiders crawl web pages and index them to serve the search engines. As the web spiders visit web pages, they could look for, and learn pieces of information that would otherwise remain undetected.

Current search engines are designed to identify pages with specific phrases and offer limited search capabilities. For example, search engines cannot search for. phrases that relate in a particular way, such as books and authors. Bibliometrics involves the study of the world of authorship and citations. It measures the co-citation strength, which is a measure of the similarity between two technical papers on the basis of their common citations. Statistical techniques are used to compute this measures. In typical bibliometric situations the citations and authorship are explicit and do not need to be mined. One of the limitations of the bibliometrics is that it cannot be used to extract buried information in the text.

Exemplary bibliometric studies are reported in: R. Larson, "Bibliometrics of the World Wide Web: An Exploratory Analysis of the Intellectual Structure of Cyberspace," Technical report, School of Information Management and Systems, University of California, Berkeley, 1996. http://sherlock.sims.berkeley.edu/docs/asis96/asis96.html; K. McCain, "Mapping Authors in Intellectual Space: A technical Overview," Journal of the American Society for Information Science, 41(6):433–443, 1990. A Dual Iterative Pattern Relation Expansion (DIPRE) method that addresses the problem of extracting (author, book) relationships from the web is described in S. Brin, "Extracting Patterns and Relations from the World Wide Web," WebDB, Valencia, Spain, 1998.

Another area to identify a set of related information on the World Wide Web is the Hyperlink-Induced Topic Search (HITS). HITS is a system that identifies authoritative web pages on the basis of the link structure of web pages. It iteratively identifies good hubs, that is pages that point to good authorities, and good authorities, that is pages pointed to by good hub pages. This technique has been extended to identify communities on the web, and to target a web crawler. One of HITS' limitations resides in the link topology of the pattern space, where the hubs and the authorities are of the same kind. i.e., they are all web pages. HITS is not defined in the text of web pages in the form of phrases containing relations in specific patterns. Exemplary HITS studies are reported in: D. Gibson et al., "Inferring Web Communities from Link Topology," HyperText, pages 225–234, Pittsburgh, Pa., 1998; J. Kleinberg, "Authoritative Sources in a Hyperlinked Environment," Proc. of 9th ACM-SIAM Symposium on Discrete Algorithms, May 1997; R. Kumar, "Trawling the Web for Emerging Cyber-Communities," published on the WWW at URL: http://www8.org/w8-papers/4a-search-mining/trawling/trawling.html) as of Nov. 13, 1999; and S. Chakrabarti et al. "Focused Crawling: A New Approach to Topic-Specific Web Resource Discovery," Proc. of The $8_{th}$ International World Wide Web Conference, Toronto, Canada, May 1999.

=Furthermore, not only is the quantity of WWW material increasing, but the types of digitized material are also increasing. For example, it is possible to store alphanumeric texts, data, audio recordings, pictures, photographs, drawings, images, video and prints. However, such large quantities of materials is of little value unless it the desired information is readily retrievable. While, as discussed above, certain techniques have been developed for accessing certain types of textual materials, these techniques are at best moderately adequate for accessing graphic, audio or other specialized materials. Consequently, there are large bodies of published materials that remain inaccessible and thus unusable or significantly under utilized.

A common technique for accessing textual materials is by means of a "keyword" combination, generally with boolean connections between the words or terms. This searching technique suffers from several drawbacks. First, the use of this technique is limited to text and is not usable for other types of material. Second, in order to develop a searchable database of terms, the host computer must usually download the entire documents, which is a time-consuming process, and does not normally provide an association between relevant terms.

Exemplary work in scalable data mining technology, is described in the following references: R. Agrawal et al., "Mining Association Rules Between Sets of Items in Large Databases, Proceedings of ACM SIGMOD Conference on Management of Data, pp. 207–216, Washington, D.C., May 1993; R. Agrawal et al., "Fast Algorithms for Mining Association Rules," Proc. of the 20th Int'l Conference on VLDB, Santiago, Chile, September 1994; and S. Brin, "Extracting Patterns and Relations from the World Wide Web," WebDB, Valencia, Spain, 1998, supra. Such work has been successfully applied to identify co-occurring patterns in many real world problems including market basket analysis, cross-marketing, store layout, and customer segmentation based on buying patterns.

Early work on applying association to texts can be found in FACT system, described in R. Feldman et al., "Mining Associations in Text in the Presence of Background Knowledge," Proceedings of the Second International Conference on Knowledge Discovery and Data Mining, Aug. 2–4, 1996, Portland, Oreg. It discovers associations amongst only keywords representing the topics of the document. The FACT system assumes that a set of predefined keywords describing the document is available. Such an assumption might not be too unrealistic for a set of well annotated documents or for a classes of documents for which text categorization system automatically produces reasonably good annotations with keywords. However, the assumption generally does not hold true for WWW pages since a major portion of the WWW pages is not well annotated. Annotation of the WWW pages by general text categorization techniques can perform poorly, in that these techniques use natural language processing (NLP) that expect grammatically correct sentences, and WWW pages frequently consist of irregular sentences.

There is therefore a great and still unsatisfied need for a software system and associated methods for automatically identifying relevant terms on the World Wide Web. The system and methods enable the automatic and iterative recognition of relevant terms by association mining and refinement of co-occurrences using hypertext link metadata, such as link annotations.

SUMMARY OF THE INVENTION

In accordance with the present invention, a computer program product is provided as an automatic mining system to identify a set of relevant terms from a large text database of unstructured information, such as the World Wide Web (WWW), with a high degree of confidence.

One feature of the present invention is to design metrics that address the learning process of relevant terms by finding associations among terms that appear as link annotations, and to minimize the association errors resulting from one or more of the following sources:

False associations governed by the rules of association algorithms.

The unknowability of the optimal metric of significance for a domain.

The large amount of noise contained within the web pages. Reference is made to R. Agrawal, et al., "Mining Association Rules Between Sets of Items in Large Databases," Proceedings of ACM SIGMOD Conference on Management of Data, pp. 207–216, Washington, D.C., May 1993.

The foregoing and other features and advantages can be accomplished by the present automatic mining system that includes a computer program product such as a software package, which is comprised of a metadata extractor, a document vector module, an association module, and a filtering module. The automatic mining system further includes a database for storing the mined sets of relevant terms. The set of relevant terms is continuously and iteratively broadened by the automatic mining system.

The automatic mining system allows the users to conduct searches expeditiously on all types of linked annotations. In order to automate the mining process, the system is provided with a novel metric that can be used to sift strongly relevant terms from the association mining result, as well as the standard metrics, confidence and support, used by the data mining community. To this end, the automatic mining system scans the downloaded hypertext link annotations in the downloaded pages, rather than the entire body of the documents for related information. As a result, the crawler is not required to provide a relatively lengthy download of the document content, and the automatic mining system minimizes the download and processing time.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items.

DETAILED DESCRIPTION OF THE INVENTION

Figure 1:
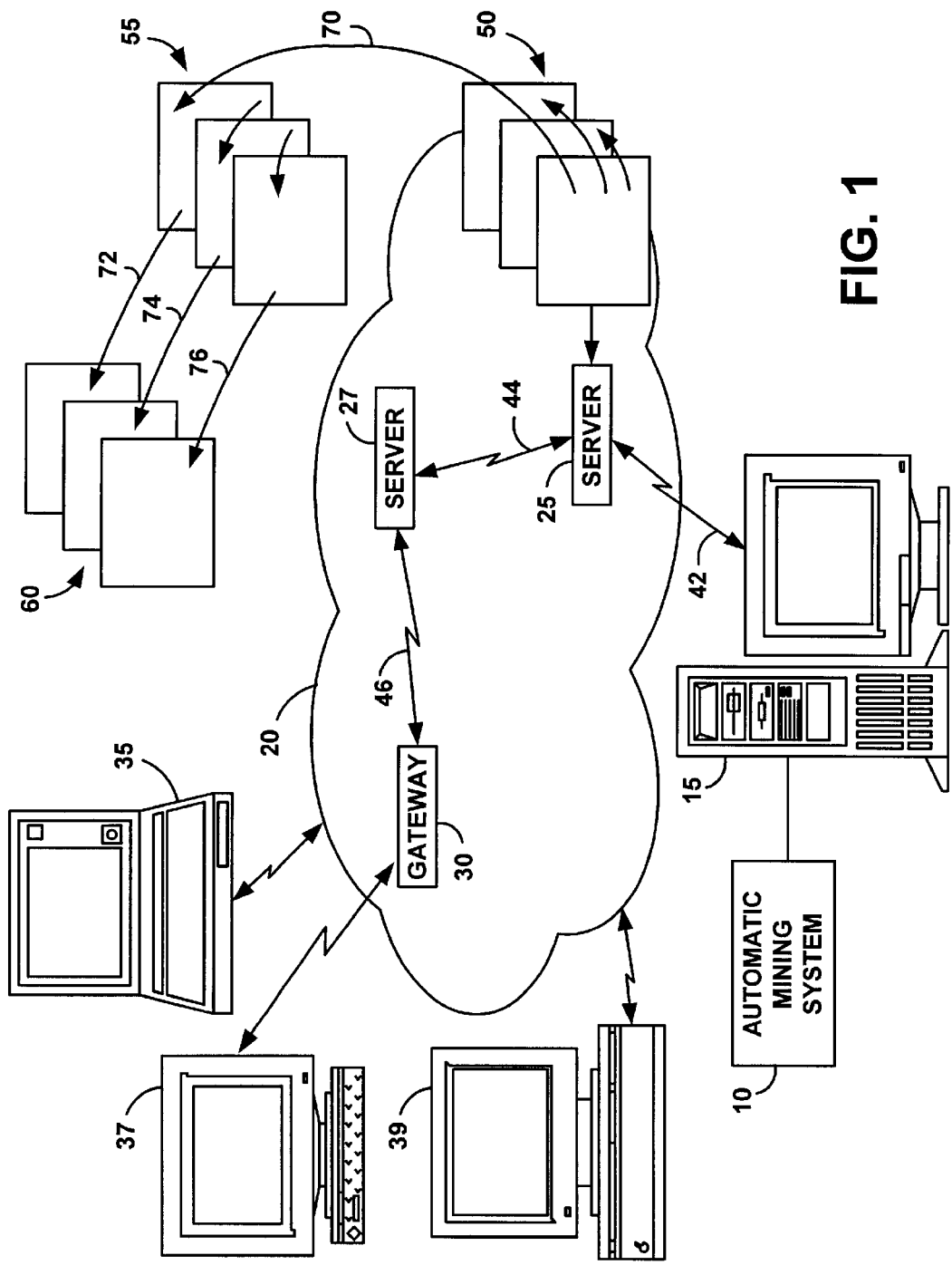
FIG. 1 is a schematic illustration of an exemplary operating environment in which the automatic mining system of the present invention can be used.

The following definitions and explanations provide background information pertaining to the technical field of the present invention, and are intended to facilitate the understanding of the present invention without limiting its scope:

Crawler or spider: A program that automatically explores the World Wide Web by retrieving a document and recursively retrieving some or all the documents that are linked to it.

Gateway: A standard interface that specifies how a web server launches and interacts with external programs (such as a database search engine) in response to requests from clients.

Hypertext System: A computer-based informational system in which documents (and possibly other types of data entities) are linked together via hypertext links to form a user-navigable web.

Hypertext Link (or hyperlink): A reference link from some point in one hypertext document to another point in another document or another place in the same document. When a user activates the link (e.g. by clicking on it with the mouse) the browser will display the destination of the link.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hypertext links to other web documents.

HTTP (Hypertext Transfer Protocol): Standard WWW client-server protocol used for the exchange of information (such as HTML documents, and client requests for such documents) between a web browser and a web server. HTTP includes several different types of messages that can be sent from the client to the server to request different types of server actions.

Internet: A collection of interconnected public and private computer networks that are linked together with routers by a set of standards protocols to form a global, distributed network.

Metadata (or annotation) of a hypertext link: Description of a hypertext link provided by the page that contains it. Ideally, it describes the concept of the linked page. This description may be found, for example, in elements around a hypertext link's anchor tags. Such elements may include attribute values or free text surrounding the hypertext link. Of these elements, anchor texts seem to be the most descriptive and frequent, and are believed to constitute serious candidates for use as annotations.

Server: A software program or a computer that responds to requests from a web browser by returning ("serving") web documents.

SGML (Standard Generalized Markup Language): A generic markup language for representing documents. SGML is an International Standard that describes the relationship between a document's content and its structure. SGML allows document-based information to be shared and re-used across applications and computer platforms in an open, vendor-neutral format. SGML is defined in "ISO 8879:1986 Information processing—Text and office systems—Standard Generalized Markup Language (SGML)", an ISO standard produced by JTC 1/SC 18 and amended by "Amendment 1:1988".

URL (Uniform Resource Locator): A unique address which fully specifies the location of a content object on the Internet. The general format of a URL is protocol://server-address/path/filename.

XML (Extensible Markup Language): A meta-language that provides a framework (or set of rules) to specify domain specific languages. Sometimes described as a simplified dialect of SGML suitable for use on the Word-Wide Web, it gives rise to such markup languages as SMIL (Synchronized Multimedia Integration Language), CML (Chemical Markup Language), MML (Mathematics Markup Language), etc.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW. World Wide Web (WWW): An Internet client-server hypertext distributed information retrieval system.

FIG. 1 portrays the overall environment in which the automatic mining system 10 according to the present invention can be used. The automatic mining system 10 includes a software or computer program product which is typically embedded within, or installed on a host server 15. Alternatively, the automatic mining system 10 can be saved on a suitable storage medium such as a diskette, a CD, a hard drive, or like devices. The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote internet users are represented by a variety of computers such as computers 35, 37, 39, and can query the automatic mining system 10 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, 60. The hypertext documents 50, 55, 60 most likely include embedded hypertext links to other locally stored pages, and hypertext links 70, 72, 74, 76 to other webs sites or documents 55, 60 that are stored by various web servers such as the server 27.

Figure 2:
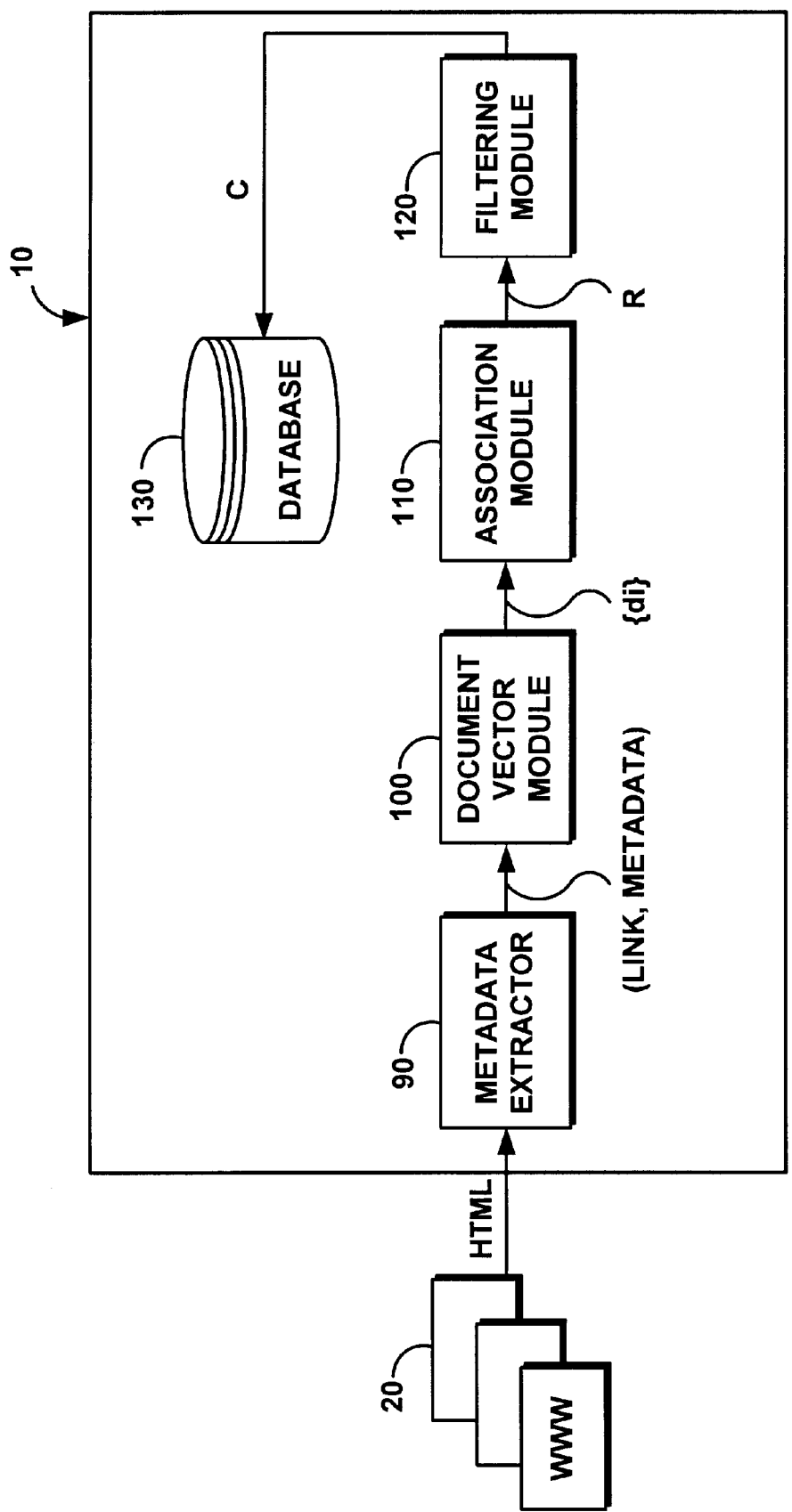
FIG. 2 is a block diagram of the automatic mining system of FIG. 1.

The automatic mining system 10 will now be described in more detail with further reference to FIG. 2. The automatic mining system 10 includes a computer program product such as a software package, which is generally comprised of a metadata extractor 90, a document vector module 100, an association module 110, and a filtering module 120. The automatic mining system 10 further includes a database 130 for storing the mined sets of relevant terms. In an alternative design, the database 130 does not form part of the automatic mining system 10.

In one embodiment, a crawler that resides in the host server 15, visits and downloads every web page or document $d_i$ on the WWW at periodic intervals, for example about once a month. During such visits, the crawler downloads all the hypertext links or hyperlinks in the document $d_i$ to the automatic mining system 10. The hypertext links can be expressed, for example, in HTML. While the crawler is capable of downloading the entire content of the document $d_i$ to the host server 15, in the exemplary embodiment described herein, the automatic mining system 10 scans the downloaded hypertext links, rather than the entire body of the documents for related information. As a result, the crawler is not required to provide a relatively lengthy download of the document content, and consequently the automatic mining system 10 minimizes the download and processing time.

Figure 3:
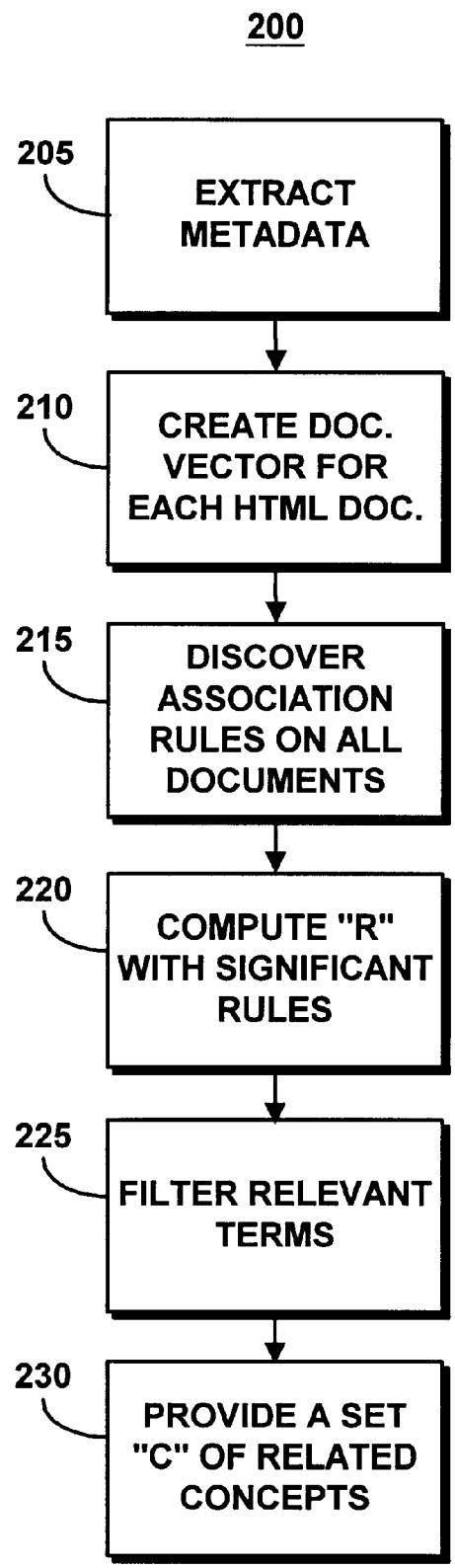
FIG. 3 is a high level flow chart that illustrates the operation of a preferred embodiment of the automatic mining system of FIG. 2.

Having described the main components of the automatic mining system 10, its operation will now be described with further reference to FIG. 3 and to the following three hypothetical documents $d_i$: ($d_1$, $d_2$, $d_3$). The document $d_1$ contains the following five exemplary hypertext links or annotations:

$a_1$: <a href="//www.abcx.org/TR/XML">XML</a>

$a_2$: <a href="//www.abcx.org/TR/namespace">XML namespace DTD SGML</a>

$a_3$: <a href="//www.abcx.org/XML">XML MathML</a>
$a_4$: <a href="//www.abcx.org/SGML">SGML MathML</a>
$a_5$: <a href="//www.abcx.org/SGML">SGML</a>

The document $d_2$ contains the following exemplary hypertext link or annotation:

$b_1$: <href://www.defy.org/>XML DTD</a>

The document $d_3$ contains the following five exemplary hypertext links or annotations:

$c_1$: <href://www.abcx.org/animal sound>tiger roar sound</a>
$c_2$: <href://www.abcx.org/animal sound>animal sound</a>
$c_3$: <href://www.abcx.org/animal sound>mountain lion fighting tiger video sound</a>
$c_4$: <href://www.abcx.org/animal video>raging bear tracking injured lion video sound</a>
$c_5$: <href://www.abcx.org/animal picture>wild cat picture</a>

The operation of the automatic mining system 10 is represented by a process 200 (FIG. 3) that starts at block or step 205 by having the metadata extractor 90 identify all the hypertext link metadata in the document $d_i$. In the above two documents ($d_1$, $d_2$), the hypertext link metadata are extracted and listed as follows:

For document $d_1$: $\{d_1\}$: ($c_{1,1}$: XML, $c_{1,2}$: *, $c_{1,3}$: namespace, $c_{1,4}$: DTD, $c_{1,5}$: SGML, $c_{1,6}$: *, $c_{1,7}$: MathML, $C_{1,8}$: *, $c_{1,9}$: *, $C_{1,10}$: *), where the asterix "*" denotes no entry or a duplicate term which is omitted, and "$c_{n,m}$" is a metadata term in the hypertext link, in which the subscript "n" refers to the document number, and the subscript "m" is the number of the term along the link annotation.

For document $d_2$: $\{d_2\}$: ($c_{2,1}$: XML, $c_{2,2}$: DTD).

For document $d_3$: $\{d_3\}$: ($c_{3,1}$: tiger, $c_{3,2}$: roar, $c_{3,3}$: sound, $c_{3,4}$: animal, $c_{3,5}$: *, $c_{3,6}$: mountain lion, $c_{3,7}$: fighting, $c_{3,8}$: tiger, $c_{3,9}$: video, $c_{3,10}$: *, $c_{3,11}$: raging bear, $c_{3,12}$: tracking, $c_{3,13}$: injured, $c_{3,14}$: lion, $c_{3,15}$: *, $c_{3,16}$: *, $c_{3,17}$: wild cat, $c_{3,18}$: picture).

When all the hypertext links are extracted at step 205, the automatic mining system 10 proceeds to block 210 for the document vector module 100 to create a document vector for each HTML document. In a preferred embodiment, the vector module 100 does not list the duplicate terms $c_{n,m}$ or the frequency of occurrence of all the terms $c_{n,m}$. Rather, the association module 110 measures the number of documents that contain the terms $c_{n,m}$ regardless of the frequency of occurrence of the terms $c_{n,m}$ within a single document. Such measurement enables the association module 110 to perform the necessary statistical analyses. It should be understood that in alternative embodiments, the vector module 100 takes into account the frequency of occurrence of the terms $c_{n,m}$ within individual documents. In the examples above, the document vectors will be as follows:

For document $d_1$: ($\{doc\_d_1\}$: $c_{1,1}$, $c_{1,3}$, $c_{1,4}$, $c_{1,5}$, $c_{1,6}$, $c_{1,7}$).

For document $d_2$: ($\{doc\_d_2\}$: $c_{2,1}$, $c_{2,2}$).

For document $d_3$: ($\{doc\_d_2\}$: $c_{3,1}$, $c_{3,2}$, $c_{3,3}$, $c_{3,4}$, $c_{3,6}$, $c_{3,7}$, $c_{3,8}$, $c_{3,9}$, $c_{3,11}$, $c_{3,12}$, $c_{3,13}$, $c_{3,14}$, $c_{3,17}$, $c_{3,18}$)

At block 215, the association module 110 discovers the association rules from all the document vectors with a certain degree of confidence and support. The association mining rules are discovered by the association module 110 solely or primarily from the hypertext links and not to the entire content of the documents $d_i$. It should however be understood that in other applications, the mining rules described herein, or other mining rules can be applied to a part or to the entirety of the content of the documents $d_i$, in order to complement the association mining method of the present invention.

Exemplary association rules are enumerated below:

1. X→Y indicates an association rule between the set of terms X and the set of terms Y, such as: the terms in X imply the terms in Y.

2. X: $\{x_1, x_2, \ldots, x_n\}$ indicates that the set of terms X is comprised of a set of sub-terms $x_i$.

3. Y: $\{y_1, y_2, \ldots, y_n\}$ indicates that the set of terms Y is comprised of a set of sub-terms $y_i$.

4. Support of an association rule X→Y is the percentage of documents that contain all the terms in the sets X and Y in the hypertext link metadata. It is the joint probability or the percentage of the frequency of co-occurrence of the sets of terms X and Y: p(X, Y). Support favors major terms that appear with frequency in the document $d_i$. As used herein, a "major term" is a term that has a high frequency of occurrence in the document $d_i$. For this reason, this metric is valuable for finding major relevant terms.

5. Confidence of an association rule X→Y is the percentage of the documents containing the sets of terms X and Y relative to the number of documents that contain the term X. In terms of probability, confidence is the conditional probability of the set of terms Y given the set of terms X, and is expressed as follows:

$$p(Y|X)=p(X, Y)/p(X),$$

where p(Y|X) is the confidence of the association rule X→Y, p(X, Y) is the support of the association rule X→Y, and p(X) is the probability or frequency of occurrence of the set of terms X. The confidence metric that favors minor terms, wherein a "minor term" is a term that has a low frequency of occurrence in the document $d_i$. For this reason, this metric is valuable for finding minor relevant terms.

6. Hybrid metric is a combination of the confidence metric that favors minor terms and the support metric that favors major terms. The hybrid metric maps to the interval [0,1], and is expressed as follows:

$$H(s,c)=a*n(s)+b*n(c),$$

where H is the hybrid metric, s is the support metric, c is the confidence metric, and a and b are predefined or preselected weighting factors such that (a+b=1). Confidence values (c) normally lie in the interval [0,1], while support values (s) do not normally rise above 0.1. For this reason, the normalization functions n(s) and n(c) linearize both the support (s) and the confidence (c), respectively, over the interval [0,1]. Such normalization renders the weighting of the support and confidence more convenient, with the factors a and b being relative normalization weights. The normalization functions n(s) and n(c) are respectively defined as follows: n(s)=[p (XML, DTD)/max(s)], and n(c)=[p(XML|DTD)/max(c)], where max(s) is the maximum support value, and max(c) is the maximum confidence value.

7. Relevance R (X, Y) of an association rule X→Y is the set defined in terms of non-exclusive terms as follows: R (X, Y): {support|confidence|hybrid}, which terms are explained above.

The foregoing association mining rules are based primarily on two premises. The first premise is that the metadata of a hypertext link provides an adequate summary description of the page to which it points (i.e., the target page). This premise is based on empirical results where experiments indicate that, with relevance judgement based on full-text as the baseline, judgment based on well-chosen metadata could be ninety percent (90%) accurate.

The second premise is based on the presumption that a hypertext document that discusses a certain topic references pages of relevant terms, and that there exists a high probability that target pages to which a common page points are related to each other and to the referring (or source) page by research results which demonstrate that hypertext links and static link topology form an invaluable resource for developing meaningful and advanced query responses. Reference is made to J. Kleinberg, "Authoritative Sources in a Hyperlinked Environment," IBM Research Report RJ 10076 (91892), May 1997; W. Li et al., "Facilitating Complex Web Queries through Visual User Interfaces and Query Relaxation," Proceedings of the 7th International World Wide Web Conference, Apr. 14–18, 1998, Brisbane, Australia; and S. Chakrabarti, et al., "Focused Crawling: A New Approach to Topic-Specific Resource Discovery," IBM Research Report, January 1999.

The association module 110 applies the foregoing rules to the examples provided above and other examples at step 220, to generate the following, non-exclusive, exemplary statistics for individual terms and for sets of terms that co-occur in the same document:

p(MXL)=30/1000, where p(XML) is the number of documents that contain term XML, and where the probability of occurrence is calculated by dividing the number of the documents the contain the term XML (e.g. 30) by the total number of documents in the database (e.g. 1000);

p(DTD)=42/1000;

p(namespace)=5/1000;

p(SGML)=22/1000;

p(tiger)=12/1000;

p(XML, DTD)=23/1000, where p(XML, DTD) is the support for the pair (XML, DTD), or, in other words, the percentage of documents that contain both terms XML and DTD;

p(XML, SGML)=11/1000;

p(XML|DTD)=p(XML, DTD)/p(XML)=23/30, where p(XML, DTD) is the confidence of the association rule XML→DTD;

p(PTD|XML)=p(XML, DTD)/p(DTD)=23/42;

H(s, c)=a*n(s)+b*n(c), where H(s, c) is the hybrid metric of the confidence metric p(XML|DTD), s=p(XML, DTD)=23/1000, c=p(XML|DTD)=23/30, a=0.5, b=0.5, max(s)=0.1, max(c)=1, a=b=0.5, n(s)=23×10/1000, n(c)=23/30), and H(s, c)=[0.5×(23/1000)×10]+[0.5×(23/30)]=0.498.

At step 220, the association module 110 determines the relevance "R" among the terms $c_{n,m}$. The relevance R (XML, DTD) for the association rule DTD→XML is set as follows for the above examples:

$$R(DTD \rightarrow XML) = \{23|23/30|0.498\}.$$

A user can select any of three relevance metrics in the above equation to determine the relevance of the terms. Suppose the user selects support as the relevance metric, then any term in the association rules where support is greater than a predetermined threshold "t" will be considered to be relevant terms. For example, if the threshold "t" is. greater than 0.01, then the relevant R(DTD→XML) is equal to 23/1000 which is greater than the threshold "t" of 0.01, and therefore the terms DTD and XML are considered to be relevant.

An exemplary significance metric is described in S. Chakrabarti, et al., "Focused Crawling: A New Approach to Topic-Specific Resource Discovery," IBM Research Report, January 1999, which is incorporated herein by reference. It should be abundantly clear that other significance metric can alternatively be used.

At step 225, the filtering module 120 filters the relevant terms $c_{n,m}$ according to predefined values set by a user or an application. In the above examples, the filtering module 120 disregards any term $c_{n,m}$, or set of terms whose support value is less than 0.01, whose confidence value is less than 0.5, and/or whose hybrid value is less than 05. These conditions or threshold parameters can be imposed either individually or collectively.

At step 230, the method 200 forwards the set "C" comprised of the related terms $c_{n,m}$ to the database 130 for storage and subsequent use.

It is to be understood that the specific embodiments of the invention that have been described are merely illustrative of certain application of the principles of the present invention. Numerous modifications may be made to automatic mining system and associated methods described herein without departing from the spirit and scope of the present invention. Moreover, while the present invention is described for illustration purpose only in relation to the WWW, it should be clear that the invention is applicable as well to databases and other tables with indexed entries.

What is claimed is:

1. A system for automatically and iteratively mining relevant terms comprising:

a metadata extractor for extracting hypertext links from a document, the hypertext links containing metadata terms $c_{n,m}$;

a document vector module for creating a vector for the document, using the hypertext links;

an association module for measuring the number of documents that contain the metadata terms $c_{n,m}$ in the hypertext links to perform a statistical analysis;

wherein the association module discovers association rules from the document vector based primarily on the hypertext links;

wherein the association rules comprise a support metric for an association rule (X|Y), where X and Y are sets of terms, and where a support p(X, Y) is defined as a joint probability of the frequency of co-occurrence of the sets of terms X and Y; and wherein the association rules further comprise a hybrid metric H(s,c) that normalize a support function n(s) and a confidence function n(c), and is expressed as follows:

$$H(s,c) = a*n(s) + b*n(c),$$

where s is the support metric, c is a confidence metric, and a and b are predefined weighting factors such that (a+b=1).

2. The system according to claim 1, further comprising a filtering module that filters relevant terms among the metadata terms $c_{n,m}$ that satisfy a predetermined criterion.

3. The system according to claim 1, further comprising a database for storing a set of previously identified relevant terms.

4. The system according to claim 1, wherein the association rules define a confidence p(Y|X) as a conditional probability of the set of terms Y given the set of terms X, as follows:

$$p(Y|X) = p(X, Y)/p(X),$$

where p(X, Y) is the support of the association rule (X|Y), and p(X) is the probability of occurrence of the set of terms X.

5. The system according to claim 1, wherein the support functions n(s) and the confidence function n(c) are respectively defined as follows:

n(s)=[p(XML, DTD)/max(s)], and n(c)=[p(XML*DTD)/max(c)], where max(s) is a maximum support value, and max(c) is a maximum confidence value.

6. The system according to claim 1, wherein the association rules comprise a relevance metric of an association rule (X|Y), where relevance R(X, Y) is defined as a matrix as follows:

R(X, Y): {support*confidence*hybrid}, wherein a user can select any one or more metrics: support, confidence, hybrid.

7. A computer program product for automatically and iteratively mining relevant terms comprising:

a metadata extractor for extracting hypertext links from a document, the hypertext links containing metadata terms $c_{n,m}$;

a document vector module for creating a vector for the document, using the hypertext links;

an association module for measuring the number of documents that contain the metadata terms $c_{n,m}$ in the hypertext links to perform a statistical analysis;

wherein the association module discovers association rules from the document vector based primarily on the hypertext links;

wherein the association rules comprise a support metric for an association rule (X|Y), where X and Y are sets of terms, and where a support p(X, Y) is defined as a joint probability of the frequency of co-occurrence of the sets of terms X and Y; and wherein the association rules further comprise a hybrid metric H(s,c) that normalize a support function n(s) and a confidence function n(c), and is expressed as follows:

H(s,c)=a*n(s)+b*n(c), where s is the support metric, c is a confidence metric, and a and b are predefined weighting factors such that (a+b=1).

8. The computer program product according to claim 7, further comprising a filtering module that filters relevant terms among the metadata terms $c_{n,m}$ that satisfy a predetermined criterion.

9. The computer program product according to claim 7, further comprising a database for storing a set of previously identified relevant terms.

10. The computer program product according to claim 7, wherein the association rules define a confidence P(Y|X) as a conditional probability of the set of terms Y given the set of terms X, as follows:

p(Y|X)=p(X, Y)/p(X), where p(X, Y) is the support of the association rule (X|Y), and p(X) is the probability of occurrence of the set of terms X.

11. The computer program product according to claim 7, wherein the support functions n(s) and the confidence function n(c) are respectively defined as follows:

n(s)=[p(XML, DTD)/max(s)], and n(c)=[p(XML*DTD)/max(c)], where max(s) is a maximum support value, and max(c) is a maximum confidence value.

12. The computer program product according to claim 7, wherein the association rules comprise a relevance metric of an association rule (X|Y), where relevance R(X, Y) is defined as a matrix as follows:

R(X, Y): {support*confidence*hybrid}, wherein a user can select any one or more metrics: support, confidence, hybrid.

13. A method for automatically and iteratively mining relevant terms comprising:

extracting hypertext links containing metadata terms $c_{n,m}$ from a document;

creating a vector for the document, using the hypertext links;

measuring the number of documents that contain the metadata terms $c_{n,m}$ in the hypertext links to perform a statistical analysis;

discovering association rules from the document vector based primarily on the hypertext links;

wherein the association rules comprise a support metric for an association rule (X|Y), where X and Y are sets of terms, and where a support p(X, Y) is defined as a joint probability of the frequency of co-occurrence of the sets of terms X and Y; and wherein the association rules further comprise a hybrid metric H(s,c) that normalize a support function n(s) and a confidence function n(c), and is expressed as follows:

H(s,c)=a*n(s)+b*n(c), where s is the support metric, c is a confidence metric, and a and b are predefined weighting factors such that (a+b=1).

14. The method according to claim 13, further comprising filtering relevant terms among the metadata terms $c_{n,m}$ that satisfy a predetermined criterion.

15. The method according to claim 13, further comprising storing a set of previously identified relevant terms.

16. The method according to claim 13, further comprising defining a confidence p(Y|X) as a conditional probability of the set of terms Y given the set of terms X, and as follows:

p(Y|X)=p(X, Y)/p(X), where p(X, Y) is the support of the association rule (X|Y), and p(X) is the probability of occurrence of the set of terms X.

17. The method according to claim 13, wherein discovering the association rules comprises setting a relevance metric of an association rule (X|Y), where relevance R(X, Y) is defined as a matrix as follows:

R(X, Y): {support*confidence*hybrid}, wherein a user can select any one or more metrics: support, confidence, hybrid.

18. The method according to claim 13, wherein the support functions n(s) and the confidence function n(c) are respectively defined as follows:

n(s)=[p(XML, DTD)/max(s)], and n(c)=[p(XML*DTD)/max(c)], where max(s) is a maximum support value, and max(c) is a maximum confidence value.

19. A computer program product having instruction codes for automatically and iteratively mining relevant terms comprising:

a first set of instruction codes for extracting hypertext links from a document, the hypertext links containing metadata terms $c_{n,m}$;

a second set of instruction codes for creating a vector for the document, using the hypertext links;

a third set of instruction codes for measuring the number of documents that contain the metadata terms $c_{n,m}$ in the hypertext links to perform a statistical analysis;

wherein the third set of instruction codes discovers association rules from the document vector based primarily on the hypertext links;

wherein the association rules comprise a support metric for an association rule (X|Y), where X and Y are sets of terms, and where a support p(X, Y) is defined as a joint probability of the frequency of co-occurrence of the sets of terms X and Y; and wherein the association rules further comprise a hybrid metric H(s,c) that normalize a support function n(s) and a confidence function n(c), and is expressed as follows:

$$H(s,c)=a*n(s)+b*n(c),$$

where s is the support metric, c is a confidence metric, and a and b are predefined weighting factors such that (a+b=1).

20. The computer program product according to claim 19, further comprising a fourth set of instruction codes for filtering relevant terms among the metadata terms $c_{n,m}$ that satisfy a predetermined criterion.

21. The computer program product according to claim 19, further comprising a datastore for storing a set of previously identified relevant terms.

22. The computer program product according to claim 19, further comprising a fifth set of instruction codes for defining a confidence p(Y|X) as a conditional probability of the set of terms Y given the set of terms X, as follows:

$$p(Y|X)=p(X, Y)/p(X),$$

where p(X, Y) is the support of the association rule (X|Y), and p(X) is the probability of occurrence of the set of terms X.

23. The computer program product according to claim 19, wherein the fifth set of instruction codes further defines the support functions n(s) and the confidence function n(c) as follows:

$$n(s)=[p(XML, DTD)/\max(s)], \text{ and}$$

$$n(c)=[p(XML*DTD)/\max(c)],$$

where max(s) is a maximum support value, and max(c) is a maximum confidence value.

24. The computer program product according to claim 19, wherein the association rules comprise a relevance metric of an association rule (X|Y), where relevance R(X, Y) is defined as a matrix as follows:

$$R(X, Y): \{support*confidence*hybrid\},$$

wherein a user can select any one or more metrics: support, confidence, hybrid.

25. A system for automatically and iteratively mining relevant terms comprising:

means for extracting hypertext links from a document, the hypertext links containing metadata terms $c_{n,m}$;

means for creating a vector for the document, using the hypertext links;

means for measuring the number of documents that contain the metadata terms $c_{n,m}$ in the hypertext links to perform a statistical analysis;

wherein the means for measuring the number of documents that contain the metadata terms $c_{n,m}$ in the hypertext, discovers association rules from the document vector based primarily on the hypertext links;

wherein the association rules comprise a support metric for an association rule (X|Y), where X and Y are sets of terms, and where a support p(X, Y) is defined as a joint probability of the frequency of co-occurrence of the sets of terms X and Y; and wherein the association rules further comprise a hybrid metric H(s,c) that normalize a support function n(s) and a confidence function n(c), and is expressed as follows:

$$H(s,c)=a*n(s)+b*n(c),$$

where s is the support metric, c is a confidence metric, and a and b are predefined weighting factors such that (a+b=1).

26. The system according to claim 25, further comprising a means for filtering relevant terms among the metadata terms $c_{n,m}$ that satisfy a predetermined criterion.

27. The system according to claim 25, further comprising a datastore for storing a set of previously identified relevant terms.

28. The system according to claim 25, further comprising means for defining a confidence p(Y|X) as a conditional probability of the set of terms Y given the set of terms X, as follows:

$$p(Y|X)=p(X, Y)/p(X),$$

where p(X, Y) is the support of the association rule (X|Y), and p(X) is the probability of occurrence of the set of terms X.

29. The system according to claim 25, wherein the means for defining the confidence p(Y|X) further defines the support functions n(s) and the confidence function n(c) as follows:

$$n(s)=[p(XML, DTD)/\max(s)], \text{ and}$$

$$n(c)=[p(XML*DTD)/\max(c)],$$

where max(s) is a maximum support value, and max(c) is a maximum confidence value.

30. The system according to claim 25, wherein the association rules comprise a relevance metric of an association rule (X|Y), where relevance R(X, Y) is defined as a matrix as follows:

$$R(X, Y): \{support*confidence*hybrid\},$$

wherein a user can select any one or more metrics: support, confidence, hybrid.

* * * * *